US006184301B1

(12) United States Patent
Shindo et al.

(10) Patent No.: US 6,184,301 B1
(45) Date of Patent: Feb. 6, 2001

(54) SOLID GOLF BALL

(75) Inventors: Jun Shindo; Kazuyuki Ichioka, both of Chichibu (JP)

(73) Assignee: Bridgestone Sports Co., Ltd., Tokyo (JP)

( * ) Notice: Under 35 U.S.C. 154(b), the term of this patent shall be extended for 0 days.

(21) Appl. No.: 09/083,031

(22) Filed: May 22, 1998

(30) Foreign Application Priority Data

May 23, 1997 (JP) ........................................ 9-150420

(51) Int. Cl.[7] .............................. A63B 37/06; C08L 9/00; C08C 19/28; C08K 5/372
(52) U.S. Cl. .................... 525/261; 525/288; 473/371; 473/372; 473/373; 473/374; 473/377
(58) Field of Search .................................. 525/261, 288; 473/371, 372, 373, 374, 377

(56) References Cited

U.S. PATENT DOCUMENTS 3,374,191 * 3/1968 Nutzel .
5,131,662 * 7/1992 Pollitt .
5,252,652 * 10/1993 Egashira .
5,567,784 * 10/1996 Wieder .
5,585,440 * 12/1996 Yamada .

* cited by examiner

Primary Examiner—David J. Buttner
(74) Attorney, Agent, or Firm—Sughrue, Mion, Zinn Macpeak & Seas, PLLC

(57) ABSTRACT

The solid golf ball of the invention is a one-piece golf ball or a multi-piece golf ball having a solid core enclosed directly in a cover or with an intermediate layer disposed therebetween. The one-piece golf ball or the solid core and/or intermediate layer of the multi-piece golf ball is formed of a rubber composition comprising a base rubber, an unsaturated carboxylic acid or a metal salt thereof, and a sulfur halide. Owing to the optimal degree of deformation and high resiliency of the elastic rubber portion therein, the solid golf ball has an excellent feel and an excellent flight performance.

10 Claims, No Drawings

SOLID GOLF BALL

BACKGROUND OF THE INVENTION

1. Field of the Invention

This invention relates to a solid golf ball having a good feel when hit and improved flight performance.

2. Prior Art

Solid golf balls are one-piece balls or multi-piece balls, the latter being composed either of a solid core enclosed within a cover (two-piece golf balls) or a solid core and a cover with one or more intermediate layers disposed therebetween (three or multi-piece golf balls). These solid golf balls are composed in part (the solid core, and sometimes the intermediate layer, in multi-piece golf balls) or in whole (one-piece golf balls) of an elastic portion obtained by molding and vulcanizing a rubber composition.

Conventional rubber compositions for this elastic portion are obtained by blending a base rubber composed primarily of polybutadiene rubber with a co-crosslinking agent, which is an unsaturated carboxylic acid or a metal salt thereof, in order to give the ball a certain degree of hardness and improve the impact resistance and resiliency. Through the action of a crosslinking initiator such as a peroxide, this co-crosslinking agent grafts or crosslinks to the backbone of the polybutadiene rubber, forming a three-dimensionally crosslinked polymer composed of polybutadiene and the co-crosslinking agent. This imparts a suitable degree of hardness, as well as durability and resiliency, to one-piece golf balls or to the core or intermediate layer of multi-piece golf balls, thus providing solid golf balls with a good flight performance and durability.

However, golfers have very strong desires concerning the flight performance of golf balls, today they expect even better flight performance as well as, to this end, further improvement in the resiliency of golf ball materials. In addition, the high regard for soft-type golf balls, which are solid two-piece or other multi-piece balls having softer cores to soften the feel of the ball when hit, and for spin-type balls in which soft cover stock is used to achieve improved spin performance, has also led to a heightened demand for better resiliency in golf ball materials.

SUMMARY OF THE INVENTION

The object of the present invention is therefore to provide solid golf balls having a rubber portion with a high resiliency and exhibiting a soft feel when hit and an excellent flight performance.

The inventions have discovered that, by adding sulfur halide to a rubber composition of a base rubber such as polybutadiene rubber in which an unsaturated carboxylic acid or a metal salt thereof is blended as a co-crosslinking agent, or by pre-treating the base rubber with sulfur halide, the rubber elastomer obtained when the resulting composition is vulcanized has an improved resiliency. Moreover, by using this rubber composition to form a one-piece golf ball or the core and/or intermediate layer of a multi-piece golf ball, solid golf balls can be obtained having an improved initial velocity, an excellent flight performance, and a soft feel when hit.

Accordingly, the present invention provides a solid golf ball in the form of a one-piece golf ball or a multi-piece golf ball having a solid core enclosed directly in a cover or with an intermediate layer disposed therebetween. In one embodiment, the one-piece golf ball or the solid core and/or intermediate layer of the multi-piece golf ball is formed of a rubber composition comprising a base rubber, an unsaturated carboxylic acid or a metal salt thereof, and a sulfur halide. In another embodiment, the one-piece golf ball or the solid core and/or intermediate layer of the multi-piece golf ball is formed of a rubber composition comprising a base rubber treated with a sulfur halide, and an unsaturated carboxylic acid or a metal salt thereof.

DETAILED DESCRIPTION OF THE INVENTION

The solid golf balls of the invention encompass both one-piece golf balls and multi-piece golf balls having a solid core enclosed directly in a cover (two-piece) or having a solid core enclosed in a cover with an intermediate layer disposed therebetween (multi-piece). As mentioned above, the one-piece golf ball or the core and/or intermediate layer of a multi-piece solid golf ball is made of a rubber composition containing a base rubber, an unsaturated carboxylic acid or a metal salt thereof, and a sulfur halide, or of a rubber composition containing a base rubber treated with a sulfur halide, and an unsaturated carboxylic acid or a metal salt thereof.

The base rubber included in the rubber composition may be any rubber used in conventional solid cores. This is typically a natural rubber and/or synthetic rubber, with the use of 1,4-polybutadiene containing at least 40% of cis structure being especially preferable. Natural rubber, polyisoprene rubber and the like may also be blended as desired into this polybutadiene. When polybutadiene rubber is included as the primary component of the base rubber, the polybutadiene content is preferably set at not less than 80% by weight, and more preferably 90 to 100% by weight, of all the base rubber components. A content of less than 80% by weight may make it difficult to achieve the high resilience desired.

The unsaturated carboxylic acid or a metal salt thereof is blended as a co-crosslinking agent. Examples include unsaturated carboxylic acids having 3 to 8 carbons, such as acrylic acid, methacrylic acid, maleic acid and fumaric acid, and the zinc salts thereof. Of these, the use of acrylic acid, methacrylic acid, or their zinc salts is especially preferred. The content of the unsaturated carboxylic acid or its metal salt may be suitably adjusted, although it is generally preferable to use this within a range of 15 to 35 parts by weight, and especially 20 to 33 parts by weight, per 100 parts by weight of the base rubber.

A co-crosslinking initiator may be used in the rubber compositions of the invention. This co-crosslinking initiator is preferably an organic peroxide, suitable examples of which include dicumyl peroxide, t-butyl peroxybenzoate, di-t-butyl peroxide, and 1,1-bis(t-butylperoxy)-3,3,5-trimethylcyclohexane. This organic peroxide is generally included in an amount of 0.5 to 2.5 parts by weight, and preferably 0.7 to 1.5 parts by weight, per 100 parts by weight of the base rubber.

In addition, other components such as inert fillers and antioxidants may also be blended in the rubber composition. Examples of these include substances familiar to the art, such as zinc oxide and barium sulfate.

It is essential to the practice of the invention that either sulfur halide be blended into a rubber composition comprising the above base rubber and the above unsaturated carboxylic acid or a metal salt thereof, or that use be made a base rubber treated with sulfur halide. The use of sulfur halide serves to impart the solid core with both a good degree of deformation and resiliency. In the finished golf ball, the sulfur halide helps to provide an improved flight distance while yet maintaining a good feel when the ball is hit.

Any sulfur halide may be used, examples of which include disulfur dichloride, sulfur dichloride, sulfur monochloride, thionyl chloride and sulfur bromide. These may be used singly or in combinations of two or more. The use of disulfur dichloride and thionyl chloride is especially preferred.

The sulfur halide may be used in any amount, although the sulfur halide content of the rubber composition is preferably 0.03 to 0.5 parts by weight, and especially 0.05 to 0.4 parts by weight, per 100 parts by weight of the base rubber. At a content of less than 0.03 parts by weight, the resilience-improving effect is too small, conversely a content of more than 0.5 parts by weight results in the rubber having a higher viscosity in the unvulcanized state, thereby compromising the workability of the rubber during extrusion.

Any suitable method may be employed to blend the sulfur halide into the rubber composition. For example, it may be kneaded together with the above components used in preparing the rubber composition. Another method that can be used is to first knead and disperse the sulfur halide in the base rubber, then to blend this with the unsaturated carboxylic acid or metal salt thereof and the other components.

Pre-treatment of the base rubber with the sulfur halide may be carried out as follows. When polybutadiene rubber is used as the base rubber, for example, sulfur halide is added to the polymer solution following polybutadiene rubber synthesis or to a solution of polybutadiene dissolved in toluene or the like. The mixture is agitated for treatment, and the solvent is finally removed.

In practicing the invention, methods known to the art may be employed to obtain solid golf balls from the above rubber composition. Thus, the rubber composition may be worked in a conventional kneading apparatus such as a Banbury mixer or a roll mill, and compression-molded or injection-molded in a solid core mold. The molded piece may then be heated and cured at a temperature sufficient for the crosslinking agent and the co-crosslinking agent to work (e.g., 130 to 170° C. when dicumyl peroxide is used as the crosslinking agent and zinc acrylate is used as the co-crosslinking agent), thereby giving the solid core. The cover stock may be injection-molded to form a cover over the solid core, yielding a golf ball.

In the solid golf ball of the invention, the solid core made of the above rubber composition may have either a single-layer or a multi-layer construction. When the solid core is used as the core of a two-piece golf ball, it is generally preferable to form the core to have a diameter of 36.6 to 39.9 mm, and especially 37.9 to 39.1 mm, and a weight of 32 to 38 g, and preferably 33 to 37 g.

The golf ball of the invention may be either a one-piece golf ball or a multi-piece golf ball having one or more intermediate layers formed on the surface of the solid core.

When an intermediate layer is formed on the surface of the solid core of the invention, the intermediate layer may be a rubber layer or a resin layer formed of a material known to the art. When a rubber layer is used, the addition of sulfur halide is recommended. In this case, the same conditions as were described above for the solid core may likewise be employed with regard to, for example, the amounts of the various components blended in the rubber composition.

Materials known to the art may be used in the cover and the above intermediate layer which are formed over the solid core. Examples of such materials include thermoplastic polyurethane elastomers, ionomer resins, polyester elastomers, polyamide elastomers, propylene-butadiene copolymers, 1,2-polybutadiene, and styrene-butadiene copolymers.

A plurality of dimples may be formed on the surface of the solid golf ball of the invention in the same manner as in conventional golf balls. The number of dimples is not particularly limited, and may be the same as in conventional golf balls. The dimples may be of two or more types having different diameters, depths and other characteristics. These characteristics such as diameter, depth and shape may be the same as in conventional golf balls. No particular limit is imposed on the arrangement of the dimples. For example, known arrangements such as regular octahedral, regular dodecahedral and regular icosahedral arrangements may be used. Any of various patterns may be represented on the ball surface by the dimple arrangement, including square, hexagonal, pentagonal and triangular patterns Other characteristics of the solid golf ball of the invention may be set as appropriate under the Rules of Golf so long as the ball remains within the scope of the invention.

The solid golf ball of the invention has an elastic rubber portion which undergoes a suitable degree of deformation and has a high resilience, giving the ball an excellent feel and flight performance.

EXAMPLE

The following examples and comparative examples are provided to illustrate the invention, and are not intended to limit the scope thereof.

Example I and Comparative Example I

Rubber compositions were prepared by mixing the components shown in Table 1 (in parts by weight) within a closed kneader. The resulting compositions were placed in molds and vulcanized at 155° C. for 20 minutes, thereby forming solid cores having a diameter of 38.5 mm for two-piece golf balls.

The amount of deformation (or deflection) under a load of 100 kg and the initial velocity of the resulting solid cores were measured. The results are shown in Table 1.

TABLE 1

| | Core No. | 1 | 2 | 3 | 4 | 5 | 6 | 7 |
|---|---|---|---|---|---|---|---|---|
| Core formu- lation (parts | Polybutadiene rubber* | 100 | 100 | 100 | 100 | 100 | 100 | 100 |
| | Zinc diacrylate | 27 | 27 | 27 | 27 | 27 | 27 | 27 |
| | Zinc oxide | 5 | 5 | 5 | 5 | 5 | 5 | 5 |

TABLE 1-continued

|  | Core No. | 1 | 2 | 3 | 4 | 5 | 6 | 7 |
|---|---|---|---|---|---|---|---|---|
| by weight) | Barium sulfate | 15.8 | 15.8 | 15.8 | 15.8 | 15.8 | 15.8 | 15.8 |
|  | Peroxide (1)* | 0.6 | 0.6 | 0.6 | 0.6 | 0.6 | 0.6 | 0.6 |
|  | Peroxide (2)* | 0.6 | 0.6 | 0.6 | 0.6 | 0.6 | 0.6 | 0.6 |
|  | Disulfur dichloride | — | 0.02 | 0.05 | 0.14 | 0.30 | 0.60 | — |
|  | Thionyl chloride | — | — | — | — | — | — | 0.14 |
| Solid core | Deflection (mm)* | 3.1 | 3.1 | 3.1 | 3.15 | 3.16 | 3.32 | 3.12 |
|  | Initial velocity (m/s)* | 76.32 | 76.36 | 76.55 | 76.70 | 76.65 | 76.60 | 76.60 |

*Notes:
cis-1,4-Polybutadiene: JSR BR01, manufactured by Japan Synthetic Rubber Co., Ltd.
Peroxide (1): Dicumyl peroxide
Peroxide (2): 40% dilution of 1,1-bis(t-butylperoxy) 3,3,5-trimethylcyclohexane
Deflection: Amount of deformation (in mm) under a load of 100 kg. A larger value indicates a softer core.
Initial velocity: Measured using the same type of initial velocity instrument as the United States Golf Association (USGA).

As is apparent from the results in Table 1, compared with core No. 1 in which no sulfur halide was added, cores No. 2 to 7 composed of inventive rubber compositions having disulfur dichloride or thionyl chloride blended therein show comparable or better deflection. In addition, the initial velocity of the cores themselves is excellent.

In Core No. 6, the rubber prior to vulcanization had a higher viscosity, making the rubber somewhat difficult to work with during production.

Cores No. 1 and 4 obtained above were selected, and similar ionomer resin covers were formed over each to give two-piece solid golf balls having a diameter of 42.7 mm.

These two-piece golf balls were measured for deflection, initial velocity, and flight distance, with the results shown in Table 2.

TABLE 2

| Two-piece golf balls | Comparative Example | Inventive Example |
|---|---|---|
| Core No. used | 1 | 4 |
| Weight (g) | 45.3 | 45.3 |
| Deflection (mm)* | 2.45 | 2.49 |
| Initial velocity (m/s)* | 77.04 | 77.28 |
| Flight distance* | | |
| Carry (m) | 206 | 209 |
| Total (m) | 223 | 226 |

*Notes:
Deflection: Amount of deformation under a load of 100 kg.
Initial velocity: Measured using the same type of initial velocity instrument as the USGA.
Flight distance: Distance obtained when hit with a driver (#1W) at a head speed of 45 m/s using a swing robot.

From the results in Table 2, it is apparent that the solid two-piece golf ball of the inventive example has a higher initial velocity and a greater flight distance than the solid two-piece golf ball of the comparative example.

Example II

At room temperature, cis-1,4-polybutadiene (JSR BR01, Japan Synthetic Rubber) was dissolved in n-hexane. Disulfur dichloride was added to this solution in an amount of (B) 0.14 part by weight or (C) 0.30 part by weight per 100 parts by weight of the polybutadiene rubber, and mixed by thorough stirring. The solvent was then removed and vacuum drying was carried out at room temperature, yielding disulfur dichloride-treated base rubber. For the sake of comparison, an untreated base rubber (A) was produced by dissolving the same cis-1,4-polybutadiene in n-hexane, and drying in the same manner as above.

Using these treated and untreated polybutadienes, rubber compositions were prepared in the proportions shown in Table 3 by working together the components in a conventional closed kneading apparatus. Solid cores having a diameter of 38.5 mm for two-piece golf balls were produced therefrom. The cores were measured for deflection and initial velocity, with the results shown in Table 3.

TABLE 3

| Core No. | A | B | C |
|---|---|---|---|
| Core formulation (parts by weight) | | | |
| Polybutadiene rubber | 100 | — | — |
| Treated polybutadiene rubber (1) | — | 100.14 | — |
| Treated polybutadiene rubber (2) | — | — | 100.3 |
| Zinc diacrylate | 27 | 27 | 27 |
| Zinc oxide | 5 | 5 | 5 |
| Barium sulfate | 15.8 | 15.8 | 15.8 |
| Peroxide (1) | 0.6 | 0.6 | 0.6 |
| Peroxide (2) | 0.6 | 0.6 | 0.6 |
| Solid core | | | |
| Deflection (mm) | 3.2 | 3.23 | 3.26 |
| Initial velocity (m/s) | 76.4 | 76.78 | 76.81 |

It is apparent from Table 3 that similarly excellent results are obtained with base rubbers which have been treated with sulfur halides.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A solid golf ball in the form of a one-piece golf ball or a multi-piece golf ball having a solid core enclosed directly in a cover or with an intermediate layer disposed therebetween, wherein the one-piece golf ball or the solid core and/or intermediate layer of the multi-piece golf ball is formed of a rubber composition comprising 100 parts by weight of a base rubber containing at least 80% by weight of polybutadiene treated with 0.03 to 0.5 parts by weight of a sulfur halide, 15 to 35 parts by weight of an unsaturated carboxylic acid or a metal salt thereof, and 0.5 to 2.5 parts by weight of an organic peroxide.

2. The solid golf ball of claim 1, wherein said unsaturated carboxylic acid or a metal salt thereof comprises 20 to 33 parts by weight of the base rubber.

3. The solid golf ball of claim 1, wherein said organic peroxide comprises 0.7 to 1.5 parts by weight per 100 parts by weight of the base rubber.

4. The solid golf ball of claim 1, wherein said sulfur halide comprises 0.05 to 0.4 parts by weight per 100 parts by weight of the base rubber.

5. A solid golf ball in the form of a one-piece golf ball or a multi-piece golf ball having a solid core enclosed directly in a cover or with an intermediate layer disposed therebetween, wherein the one-piece golf ball or the solid core and/or intermediate layer of the multi-piece golf ball is formed of a rubber composition comprising 100 parts by weight of a base rubber containing at least 80% by weight of polybutadiene, 15 to 35 parts by weight of an unsaturated carboxylic acid or a metal salt thereof, 0.5 to 2.5 parts by weight of an organic peroxide, and 0.03 to 0.5 parts by weight of a sulfur halide.

6. The solid golf ball of claim 5 wherein the sulfur halide is disulfur dichloride, sulfur dichloride, sulfur monochloride, thionyl chloride or sulfur bromide.

7. The solid golf ball of claim 5 wherein the sulfur halide is disulfur dichloride, sulfur dichloride, sulfur monochloride, thionyl chloride or sulfur bromide.

8. The solid golf ball of claim 5, wherein said unsaturated carboxylic acid or a metal salt thereof comprises 20 to 33 parts by weight per 100 parts by weight of the base rubber.

9. The solid golf ball of claim 5, wherein said organic peroxide comprises 0.7 to 1.5 parts by weight per 100 parts by weight of the base rubber.

10. The solid golf ball of claim 5, wherein said sulfur halide comprises 0.03 to 0.4 parts by weight per 100 parts by weight of the base rubber.

* * * * *